US012738570B2

(12) United States Patent
Walter et al.

(10) Patent No.: US 12,738,570 B2
(45) Date of Patent: Sep. 15, 2026

(54) THERMAL INSULATING MAT FOR BATTERY SYSTEMS

(71) Applicant: Oerlikon Friction Systems (Germany) GmbH, Bremen (DE)

(72) Inventors: Heribert Walter, Bamberg (DE); Michael Maag, Herrieden (DE); Tobias Fritz, Seukendorf (DE); Alex Thomaschpolski, Nuremberg (DE); Jessica Uhlemann, Bubenreuth (DE); Thomas Ubler, Nuremberg (DE)

(73) Assignee: Oerlikon Friction Systems (Germany) GmbH, Bremen (DE)

( * ) Notice: Subject to any disclaimer, the term of this patent is extended or adjusted under 35 U.S.C. 154(b) by 450 days.

(21) Appl. No.: 18/579,113

(22) PCT Filed: Jul. 13, 2022

(86) PCT No.: PCT/EP2022/069541

§ 371 (c)(1),
(2) Date: Jan. 12, 2024

(87) PCT Pub. No.: WO2023/285504

PCT Pub. Date: Jan. 19, 2023

(65) Prior Publication Data

US 2024/0322300 A1 Sep. 26, 2024

(30) Foreign Application Priority Data

Jul. 16, 2021 (DE) ......................... 102021118437.1

(51) Int. Cl.
*H01M 10/658* (2014.01)
*B32B 3/30* (2006.01)
(Continued)

(52) U.S. Cl.
CPC ............ *H01M 10/658* (2015.04); *B32B 3/30* (2013.01); *B32B 5/02* (2013.01); *B32B 5/26* (2013.01);
(Continued)

(58) Field of Classification Search
None
See application file for complete search history.

(56) References Cited

U.S. PATENT DOCUMENTS

2020/0343495 A1* 10/2020 Kritzer ................ H01M 10/653
2022/0359945 A1* 11/2022 Kogami .............. H01M 50/209

FOREIGN PATENT DOCUMENTS

DE 2948422 A1 6/1980
DE 102017008102 A1 2/2019
(Continued)

*Primary Examiner* — Nathanael T Zemui
(74) *Attorney, Agent, or Firm* — Hinckley Allen & Snyder; Stephen Holmes

(57) ABSTRACT

The present invention relates to a thermal insulating mat (1) for insulating adjacent battery cells (2), in particular prismatic battery cells, in battery systems, comprising an elastically deformable base plate (7) made of a fiber-elastomer composite, wherein a defined number of ribs (8) are provided on both main surfaces of the base plate (7), extending parallel to one another and spaced apart from one another transversely over the main surfaces of the base plate (7), wherein the arrangement of ribs on the two main surfaces is surrounded by a bordering frame (10), and there is a gap (11) between the ribs (8) and the frame (10), wherein the fiber-elastomer composite of the base plate (7) is formed from an elastomer matrix with at least one intermediate layer of mineral fibers embedded therein, and wherein the thermally insulating mat at the same time is able to compensate for the change in volume of the battery cells inherent in the system as a result of the chemical ageing of the cell components and
(Continued)

the cyclical expansion and contraction of the cells during charging and discharging.

15 Claims, 9 Drawing Sheets

(51) Int. Cl.

| | |
|---|---|
| ***B32B 5/02*** | (2006.01) |
| ***B32B 5/26*** | (2006.01) |
| ***B32B 15/14*** | (2006.01) |
| ***B32B 15/20*** | (2006.01) |
| ***F16L 59/02*** | (2006.01) |
| ***H01M 10/647*** | (2014.01) |
| ***H01M 50/367*** | (2021.01) |

(52) U.S. Cl.
CPC .............. *B32B 15/14* (2013.01); *B32B 15/20* (2013.01); *F16L 59/026* (2013.01); *H01M 10/647* (2015.04); *H01M 50/367* (2021.01); *B32B 2260/023* (2013.01); *B32B 2260/046* (2013.01); *B32B 2262/101* (2013.01); *B32B 2307/304* (2013.01); *B32B 2307/416* (2013.01); *B32B 2307/51* (2013.01); *B32B 2457/10* (2013.01)

(56) References Cited

FOREIGN PATENT DOCUMENTS

| | | | |
|---|---|---|---|
| DE | 102018113815 | A1 | 12/2019 |
| JP | 2018006058 | A | 1/2018 |
| WO | 2020221808 | A1 | 11/2020 |

* cited by examiner

| | Rib Separation 3 mm | Rib Separation 2 mm | Rib Separation 1,5 mm | Rib Separation 2,5 mm |
|---|---|---|---|---|
| Initial Thickness | 1,860 mm | 1,530 mm | 1,590 mm | 1,630 mm |
| Pretensioning Load | 1,623 mm | 1,400 mm | 1,490 mm | 1,518 mm |
| Full Load | 1,329 mm | 1,195 mm | 1,317 mm | 1,252 mm |
| Pretensioning Deformation | 12,74% | 8,50% | 6,29% | 6,87% |
| Maximum Deformation | 28,55% | 21,90% | 17,17% | 23,19% |

THERMAL INSULATING MAT FOR BATTERY SYSTEMS

The present invention relates to a thermal insulating mat for battery systems, in particular lithium ion battery systems, wherein the thermal insulating mat is arranged between the individual cells of the battery system so as, in the case of the failure of a battery cell, such as, for example in consequence of an overheating of the battery cell, to prevent a progression of the overheating to adjacent battery cells.

The thermal insulating mat according to the invention can be used advantageously for battery systems such as those utilized in the area of electromobility.

Battery systems are usually made up of a plurality of individual cells in order to be able to obtain the required high energy densities. A defined number of individual cells are hereby combined to form a module and individual modules are combined to form a stack and are electrically connected to one another. The obtained battery systems are accommodated in a hermetically sealed housing to protect them against external influences.

In principle, battery types are differentiated into cylindrical cells, prismatic cells, and pouch cells. Prismatic cells have a cuboid shape with a rigid housing (also referred to as a cell cup), whereas pouch cells, also called coffee bag cells, have a flexible outer cover made of a film.

The present invention relates, in particular, to battery systems with rechargeable batteries, so-called secondary cells, also referred to as accumulators. A battery system that is often utilized in the area of electromobility, for example, is based on lithium ion batteries.

For ensuring the operating safety of a battery system consisting of a plurality of individual cells, it is absolutely essential in the event that a battery cell catches fire owing to overheating, for example, to prevent a spread of the cell fire to adjacent cell and eventually even burning of the entire battery system (thermal runaway).

When a cell burns, there ensue high temperatures of 600° C. and more within only a few seconds. In order to prevent an overheating and spread of the fire onto the adjacent cells, it is necessary to take measures that prevent the temperature of the adjacent cells from rising and exceeding a critical value.

The factors determining this critical temperature value in the case of lithium ion cells are, in particular, the electrolyte or the composition thereof and the trigger range of the shutdown separator.

Utilized for lithium ion cells are liquid electrolytes that contain components that have a boiling point of around 100° C. and are readily flammable. Therefore, the cell temperature must be kept below the boiling point in order to prevent a rise in pressure in the hermetically sealed cells. If the internal pressure of the cells is too high, a safety valve opens, the gas that has formed escapes, and, as a rule, the electrolyte, which is highly reactive under these conditions, ignites immediately.

Shutdown separators are a safety measure for suppressing ion transport and for interrupting the current flow in that, when a critical temperature is exceeded, the micropores of the separator are closed. Known are shutdown separators that are made of a laminate consisting of two polymer films, with the polymers having different melting points.

For example, often used shutdown separators are constructed from a polyethylene/polypropylene laminate with a melting point of the polyethylene of 120° C. and a melting point of the polypropylene of 170° C. If the melting point of the polymer film with the lower melting point—in this case, polyethylene—is exceeded, the latter melts and closes the pores of the higher-melting polymer film—in this case, polypropylene.

It is evident from the preceding discussion that the cell temperatures need to be kept absolutely below 150° C., in particular below 120° C., and preferably possibly under 100° C. in order to prevent an overheating of the cell and the safety risks associated therewith.

It is known to provide a thermal insulating fixture between adjacent cells in order to prevent any heating of adjacent cells above the critical temperature and accordingly setting off a cell fire.

Besides the thermal insulation, still further aspects are to be taken into consideration for a safe operation of a battery system.

Thus, a thermal insulation should possess, at the same time, the function of an electrical insulator for electrical insulation of the cells or of the potential differences applied on the cell housing between the cells of a module.

A further important aspect in the design of lithium ion battery systems is the system-determined change in volume of the battery cells (also known as swelling). The cause of this is, on the one hand, the continuous cell expansion on account of the chemical ageing of the cell components and, on the other hand, the cyclic swelling and contraction of the cells during charging and discharging.

This system-inherent change in volume is to be taken into account, in particular, in the fabrication of battery systems based on prismatic cells on account of the permanent cell housing thereof. In this case, the increase in volume of the cell components leads to a bulging in the middle region of the large main surfaces. The edge region, in contrast, is mechanically stabilized via the corners to the bordering surfaces.

In the automotive area of application, in the case of a typical dimension of a prismatic cell with a length of 236 mm, a height of 115 mm, and a thickness of 32 mm, the main surfaces can bulge out by 0.2 mm to less than 1 mm during the charging of an aged prismatic cell, as a result of which, for a module with the usual 10 to 14 individual cells, a total expansion of 2 mm to less than 10 mm can ensue.

Advantageously, therefore, a thermal insulating mat should be able, in addition, to compensate for the volume expansion of the cells over the lifetime of a cell, both the cyclic change in volume occurring in the course of charging and discharging and also the continuous increase in volume.

Beyond this, the thermal insulating mat should have a weight that is as low as possible, be mounted in a space-saving manner, and be of low cost.

Thermal insulation means that, in the event of a cell fire with heat evolution of 600° C. and more within only 30 seconds, the heat transfer to an adjacent cell should advantageously be limited to below 100° C.

Ensuring the compensation of the change in volume of the cells over the service life necessitates that the material is elastically deformable and possesses an adequately low compression set, so that, under compressive stress and temperature fluctuations, it does not set.

In addition, it is to be taken into account that, for the assembly of a module, a desired number of individual cells, typically 12 to 14 units, is combined to form a stack, pressed with a defined pretensioning force of 5 to 19 kN, for example, and fixed under this pretensioning force in order to obtain a defined stack geometry.

A thermal insulating mat must be able to retain this preload over the entire service life in order to ensure the dimensional stability of the module.

In accordance with the invention, the problems set forth above are solved by a thermal insulating mat comprising an elastically deformable base plate made of a fiber-elastomer composite, wherein a number of ribs are provided on both main surfaces of the base plate, extending parallel to one another and spaced apart from one another transversely over the main surfaces of the base plate, wherein the ribs of the two main surfaces are arranged offset to one another and the base plate with a rib structure is surrounded by a bordering frame, with the ribs being decoupled from the frame.

Preferably, the frame is likewise made from an elastomer material.

"Offset arrangement" of the ribs means that the ribs of a main surface of the base plate extend within the separation between two ribs of the other main surface of the base plate.

The separation between the ribs should be wider than the width of the ribs extending above in order to allow the ribs to undergo compression into the separation.

"Decoupled" means that the ribs are not joined to the frame; that is, neither the front surfaces of the ribs nor the outer-lying side surfaces of the respective outermost ribs are in contact with the frame.

The dimensioning of the thermal insulating mat according to the invention is governed in each case by the proposed use.

In the form described here, it is designed, in particular, for use between prismatic cells. However, it can be adapted in a straightforward manner for use with other types of batteries.

For use as an intermediate insulation of prismatic battery cells, the thermal insulating mat has essentially a rectangular basic shape. In the installed state, its perimeter can be flush with the perimeter of the battery cells. Alternatively, the frame or the edge of the frame can project with the long sides or short sides or both sides over the perimeter of the battery cells.

The elastically deformable base plate has a flat rectangular shape with two main surfaces. On each of the main surfaces, there are a number of ribs, which are arranged parallel to one another and spaced apart from one another and which extend transversely over the main surfaces, with the ribs of the two main surfaces being arranged offset to one another.

The base plate with the rib arrangement is surrounded by a bordering frame.

The thermal insulating mat according to the invention is arranged with one main surface on the other main surface between bordering prismatic battery cells. In the installed state, the free top side of the frame rests against the adjacent battery cell or battery cells.

Accordingly, in the assembled state, the frame of the insulating mat extends along the dimensionally rigid edges of the battery cells and can be supported against the edges.

In this way, the pretensioning pressure that, during construction of the module, is applied to the battery cells and the frame of the thermal insulating mats can be absorbed by way of the bordering frame and can be compensated for.

In any case, the frame should undergo only slight deformation due to the pretensioning pressure and should exhibit a correspondingly small compressibility.

The compressive strength of the frame can be influenced and adjusted in various ways through the elasticity of the material, the frame width, and the frame structure.

For example, depending on the compressive modulus of the elastomer material used for the production of the frame, the frame height can be chosen in such a way that, after the pretensioning during construction of the module, a desired frame thickness is obtained.

The bulging of the main surfaces of the cells in consequence of the increase in volume due to ageing and due to the charging process is compensated over the ribs in connection with the elastically deformable base plate, as described below in detail.

If, owing to the bulging of a main surface of a battery cell, pressure is applied to the ribs of a next adjacent insulating mat according to the invention, deformation of the base plate causes the ribs to compress into the separation lying under the respective rib between the ribs arranged on the other side of the base plate. When the pressure is relieved during contraction of the bulging in consequence of discharging, for example, the ribs can rebound once again to their initial state in consequence of the elasticity of the base plate.

The elastically deformable base plate with the ribs arranged on it acts as a spring element, whereby, during application of pressure, a compression occurs and, during release of pressure, a rebound into the initial state occurs.

In accordance with an advantageous embodiment, it is possible by way of the base plate with the ribs arranged on it, which acts as a spring element, to apply additionally an adjustable pressure to the cell surfaces, so that, in addition to the pretensioning pressure, the cell stack is slightly compressed. It has been found that an additional pressure thereby achieved can act positively on the cycle stability of the cells of the stack.

The extent of the compression can be controlled by a series of various measures, which can be taken individually or else in combination of two or more thereof.

The extent of the compression can thus be controlled geometrically by the separation between the ribs, which should be at least 1.5 to 2 times the rib width.

The wider the separation in relation to the rib width, the more deformable is the structure consisting of the base plate and ribs, that is, the deeper can the rib with the base plate be pressed into the separation.

Furthermore, the extent of the compression is determined by the construction and the material for the base plate.

The base plate is made of a fiber-elastomer composite with a matrix consisting of an elastomeric plastic (elastomer) and, embedded therein, at least one intermediate layer consisting of fibers (also referred to as a fiber intermediate layer).

The elastomer must have, besides the required elasticity, an adequate temperature resistance in order to be able to withstand the high temperatures in the event of a cell fire.

Examples of suitable elastomers that resist high temperatures are silicone elastomers, such as, for example, phenyl methyl silicone rubber (PMQ), phenyl vinyl methyl silicone rubber (PVMQ), methyl silicone rubber, vinyl methyl silicone rubber (VMQ), fluorine vinyl methyl silicone rubber (FVMQ), ethylene propylene diene rubber (EPDM), styrene butadiene rubber (SBR), acrylonitrile butadiene rubber (NBR), natural rubber (NR), butyl rubber, isobutene isoprene rubber (IIR), and isoprene rubber (IR) as well as polyurethane (PUR).

The elasticity of the elastomer should preferably lie in a range of Shore A hardness of 20 to 80, in particular 45 to 75, and especially preferably 50 to 60.

In regard to the desired temperature resistance, mineral fibers are utilized for the intermediate layer consisting of fibers, such as, for example, glass fibers, basalt fibers, silicate fibers, and oxide ceramic fibers.

The mineral fibers can exist in the form of a flat structure, such as a woven or nonwoven fabric, where the flat structure itself can be produced from rovings or yarns.

Typically, fibers with area weights of 20 g/m$^2$ to 200 g/m$^2$ are utilized. If, for example, two or more fiber intermediate layers are provided, the area weight of the individual layers can lie in the lower range or even below it.

The fibers are embedded as a reinforcing intermediate layer in the elastomer matrix. In the case of two or more fiber intermediate layers, it is possible to provide a thin layer consisting of elastomer as a binder between the individual fiber intermediate layers.

A preferred material combination for the base plate is a silicone elastomer with one or two intermediate layers consisting of a fiberglass fabric.

Besides the kind of elastomer, the deformability and accordingly the extent of the compression of the base plate are determined by the orientation of the fibers.

The least deformability is shown by a 0°/90° orientation, so that, in this case, no or at most only a slight compression occurs. In contrast, in the case of a 45° orientation, the fibers show a maximum displaceability of the fibers with a maximum mutual compression of the ribs.

An example of a suitable orientation lying between these values is a 30°/120° alignment.

During compression, the base plate expands in the longitudinal direction, whereby the angle between the fibers decreases; that is, there exists an interaction between the matrix and the fibers.

Furthermore, the elasticity can be modified by the addition of inorganic fillers to the elastomer matrix. The fillers can hereby serve a purely mechanical function. During deformation of the elastomer, the separation between the particles of filler decreases until they come into mutual contact, as a result of which a further deformation of the elastomer is blocked.

The manifestation of the blockade effect can be influenced by way of a series of parameters, such as, for example, the degree of filling, the particle size and particle shape, and the grain size distribution (monomodal, bimodal, or else trimodal). For example, the particle shape, such as, for example, round or sharp-edged, influences the rheological behavior and the blocking behavior of the particles with respect to one another and with respect to the matrix.

It is fundamentally possible for the fillers to be ceramic, carbon-based, or metallic in nature. However, in choosing the filler, the thermal and electrical properties thereof are to be taken into consideration in view of the basic thermal and electrical insulation function of the thermal insulating mat according to the invention.

Preferred, therefore, are fillers that have an electrical conductivity that is as small as possible, such as, for example, ceramic fillers.

Besides the adjustment of the mechanical and electrical properties, fillers can also be added for improvement of the thermal behavior of the elastomer.

For example, fillers that reduce the thermal conduction can be utilized. These can be materials that create insulating air or gas cushions, like hollow bodies, such as, for example, hollow glass beads, or materials with high porosity, such as, for example, aerogels, aerosols, or expanded substances.

It is also possible to utilize fillers that react endothermally at fire temperature and take heat energy out of the system. These are, for example, materials that undergo ceramization, vitrification, or carbonization at fire temperature, materials that have a cooling effect, and materials that absorb oxygen, such as are fundamentally known, for example, as flame retardants for plastics.

Suitable examples are metal hydroxides or metal oxy hydroxides, that, when heated, split off water and form a protective ceramic layer, such as, for example, aluminum hydroxide (aluminum trihydrate (ATH)), which, above approximately 200° C., reacts to form $Al_2O_3$ and water, or magnesium hydroxide, which, above approximately 300° C., reacts to form MgO and water.

Further examples for suitable heat-absorbing fillers are based on polyphosphates, such as, for example, melamine polyphosphate or ammonium polyphosphate, which lose ammonia ($NH_3$) in an intumescent (expanding) manner and, through reaction of the ammonia to form nitrogen and water, act to absorb oxygen.

In principle, variation of the fillers and variation of the degree of filling make it possible to adjust and adapt the material properties advantageously in a specific manner. The degrees of filling that are to be achieved hereby depend on the grain size distribution, the grain size, and the surface reactivity of the filler particles. For example, the degree of filling for particles with a main proportion of particles having a size of between 10 and 100 μm can be up to 60 weight percent and, in the case of nanoscale particles, it can be up to far over 100 volume percent.

The prerequisite for all fillers is that they do not have a negative influence on the elasticity behavior of the elastomer.

In accordance with an advantageous embodiment, it is possible, if necessary, to provide passages in the thermal insulating mat according to the invention for the of discharge gasses that are formed by reaction of the filler and thermal decomposition of the elastomer. By means of these passages, it is possible to counter the creation of an overpressure in the region between the walls of the battery cell and the thermal insulating mat in a module that is essentially hermetically sealed by the pretensioning pressure.

For this purpose, it is possible to provide transversely extending breaks and/or outlet openings in the bordering frame.

Reaction gases that form under some circumstances can then be distributed along the breaks over the surface of the base plate and escape via the outlet openings.

It is especially advantageous when the breaks have a continuous arrangement. Breaks in adjacent ribs are hereby provided in extension of one another and thereby form a continuous channel, which is interrupted by the separations between the ribs. On account of the continuous arrangement of the breaks, the gases can escape in a directed manner.

As already mentioned, the dimensions of the thermal insulating mat according to the invention and the dimensions of their structures are determined by the requirements of the specific use. For the utilization as a thermal intermediate insulation in battery systems consisting of prismatic battery cells, such as, for example, in modules, they should have a total thickness that is as small as possible.

Preferably, in the unloaded state, the thickness should be no more than 3 mm with a rib height of 0.4 to 0.5 mm, a rib width in a range of 1.0 mm to 3.0 mm, and a separation between the ribs in a range of 1.5 to 3 times the rib width as well as a frame thickness of 5 to 10 mm.

Advantageously, the total thickness of the insulating mat under a pretensioning pressure of the battery module of 5 kN is 1.5 mm or less, in particular 1 mm or less.

It is self-evident that these values are given by way of example and can be altered in a straightforward manner depending on the respective requirements.

In accordance with a further advantageous embodiment, it is possible to provide in the base plate, in addition, an intermediate layer consisting of a metal film, which reflects infrared radiation, such as, for example, an aluminum foil. In view of the space-saving requirement, the film should be as thin as possible, such as, for example, approximately 0.1 mm.

For the production of the insulating mat according to the invention, it is possible to employ common methods of fabrication, such as those known for the production of components made of fiber-reinforced plastics. An example is the casting method or the pressing method using molds that are designed in correspondence to the desired structure of the components. Thus, for example, it is possible initially to place in a mold a first elastomer layer for the creation of the rib structure and, if need be, the structure for the bordering frame and then to introduce the fiber material for the fiber intermediate layer and subsequently to fill the mold with further elastomer material for the impregnation of the fibers as well as the formation of the further rib structure and, if need be, the frame structure.

The present invention provides a thermal insulating mat that is able to fulfill all desirable requirements for practical application:

It shows a thermal insulation capacity that, for a material thickness of approximately 1.5 mm and a temperature of 700° C. on the hot side, is less than 100° C. on the cool side;

- the base plate made of a fiber-elastomer composite can be compressed by at least 0.4 mm in order to be able to compensate for the bulging of the battery cells on account of cell ageing and the charging cycles;
- the compression set is only small, so that, over the entire lifetime of a battery module, the function of the path compensation can be ensured with retention of the pretensioning pressure;

In regard to the desired electrical insulation capacity, the breakdown voltage strength can be adjusted advantageously to at least 3 kV;

- the space requirement can be minimized in regard to the desired low packing density for battery systems;
- and it can be produced in a simple and low-cost manner.

The thermal cell insulating mat according to the invention will be explained in detail below on the basis of the appended figures, which show schematically an embodiment of the thermal insulating mat according to the invention, such as it is suitable for prismatic battery cells.

Herein:

FIG. 1 shows a plan view of an arrangement of four prismatic battery cells with a thermal insulating mat according to the invention being arranged in between;

Figure 4:
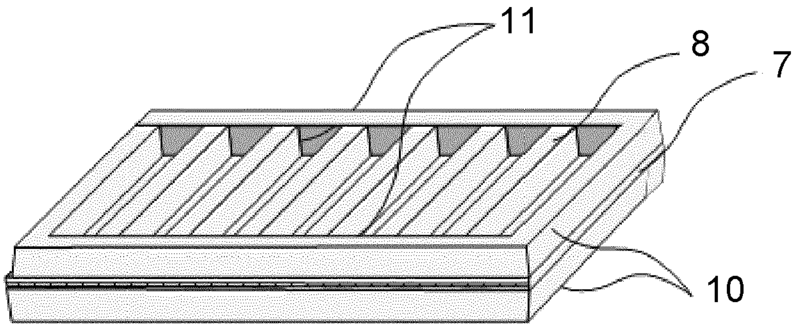
FIG. 4 shows a side view from above of the thermal insulating mat according to the invention in accordance with FIG. 3.
Figure 5A:
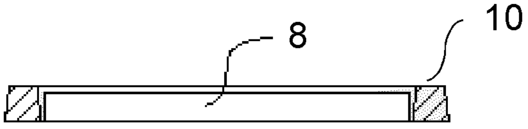
Figure 5B:
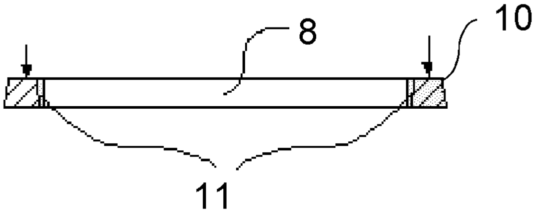
Figure 6:
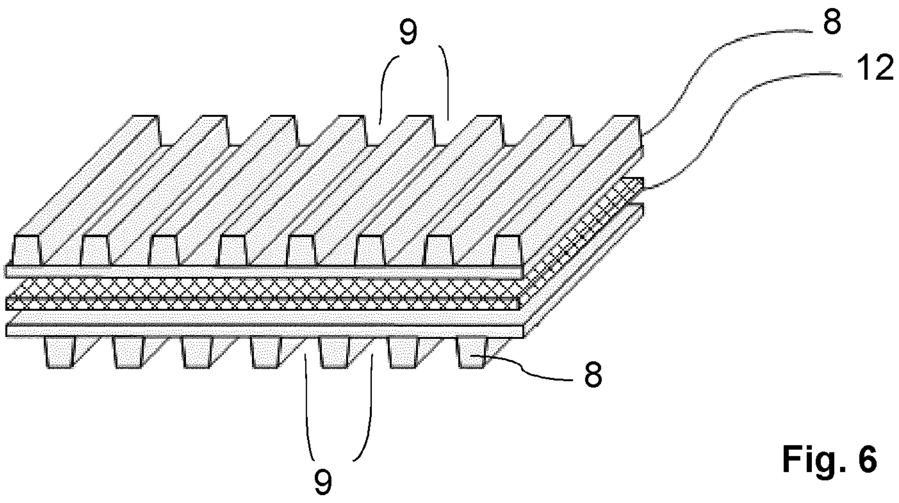
Figure 7:
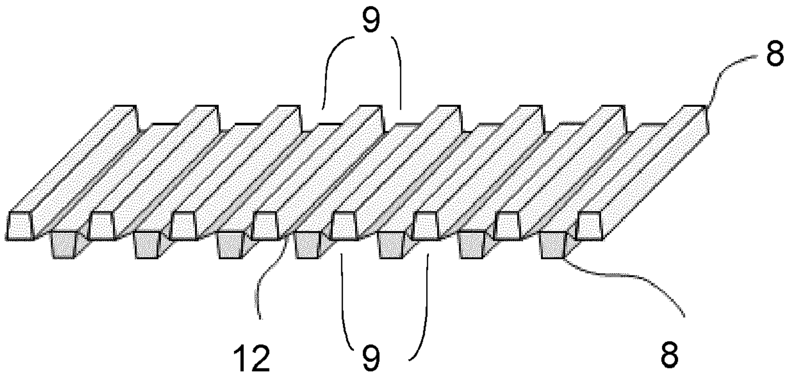
Figure 8A:
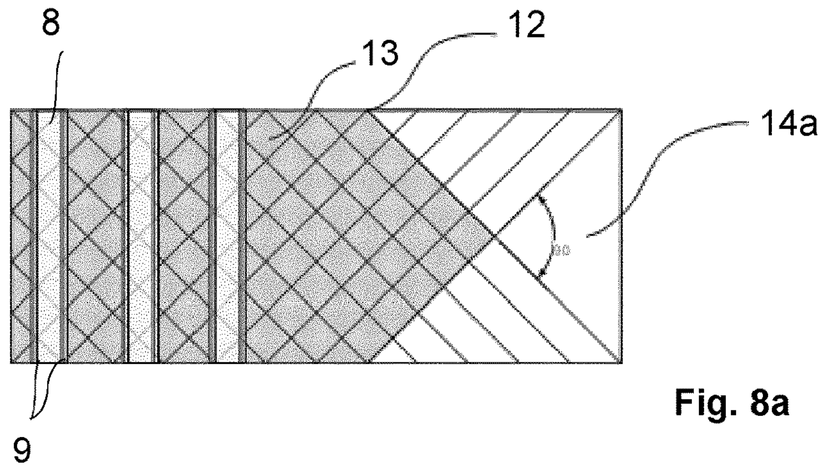
Figure 8B:
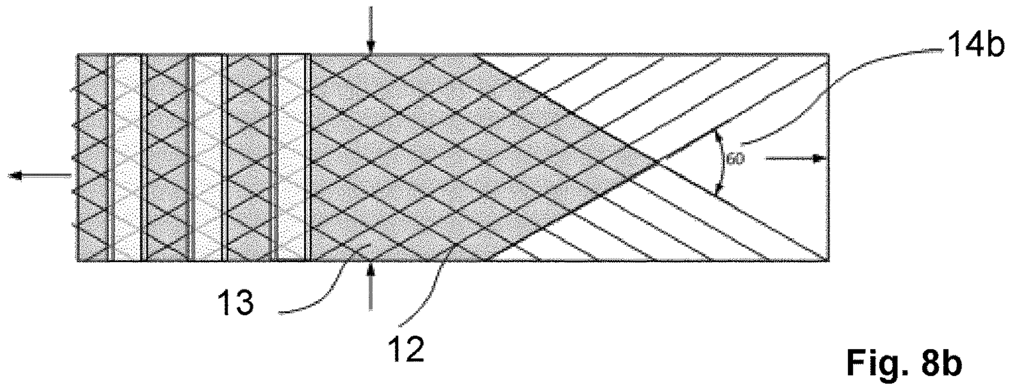
Figure 9A:
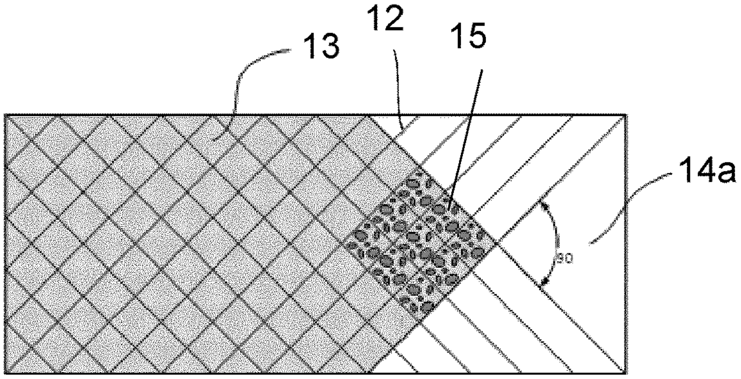
Figure 9B:
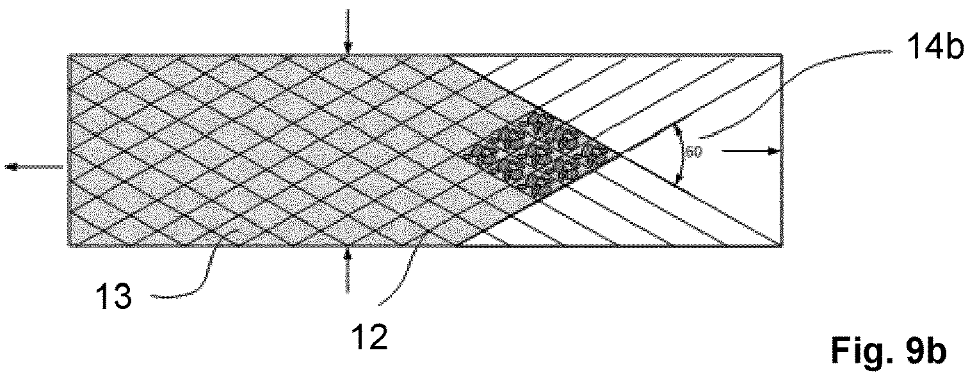
Figure 10:
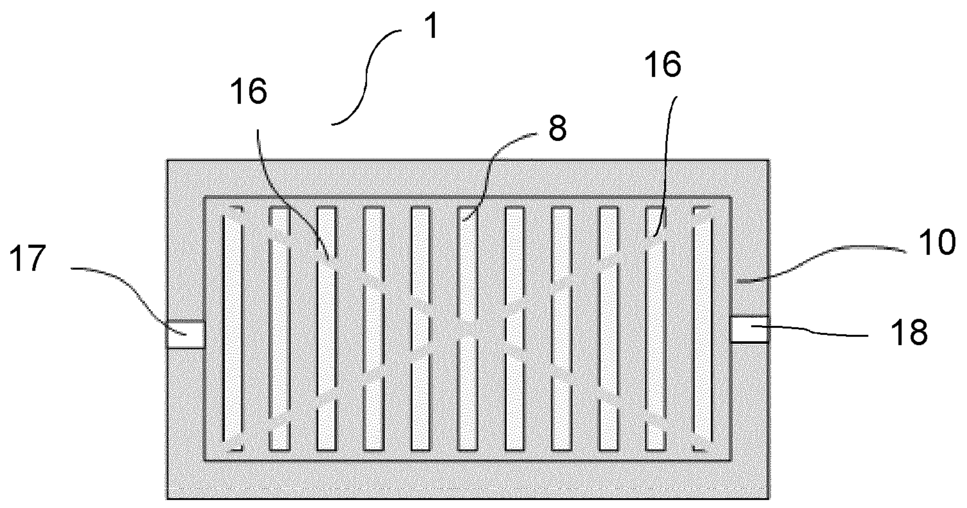
Figure 11:
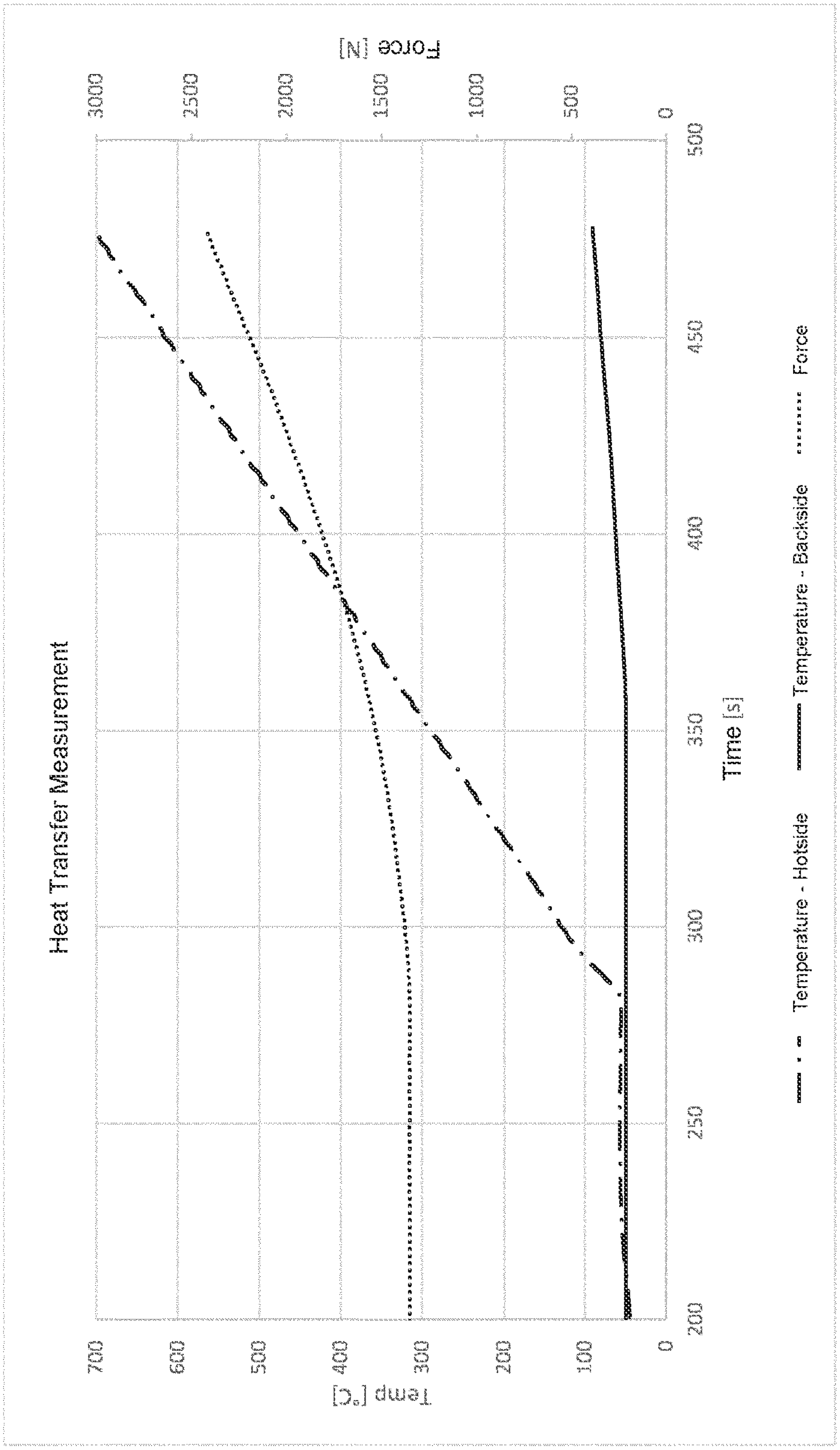
Figure 12:
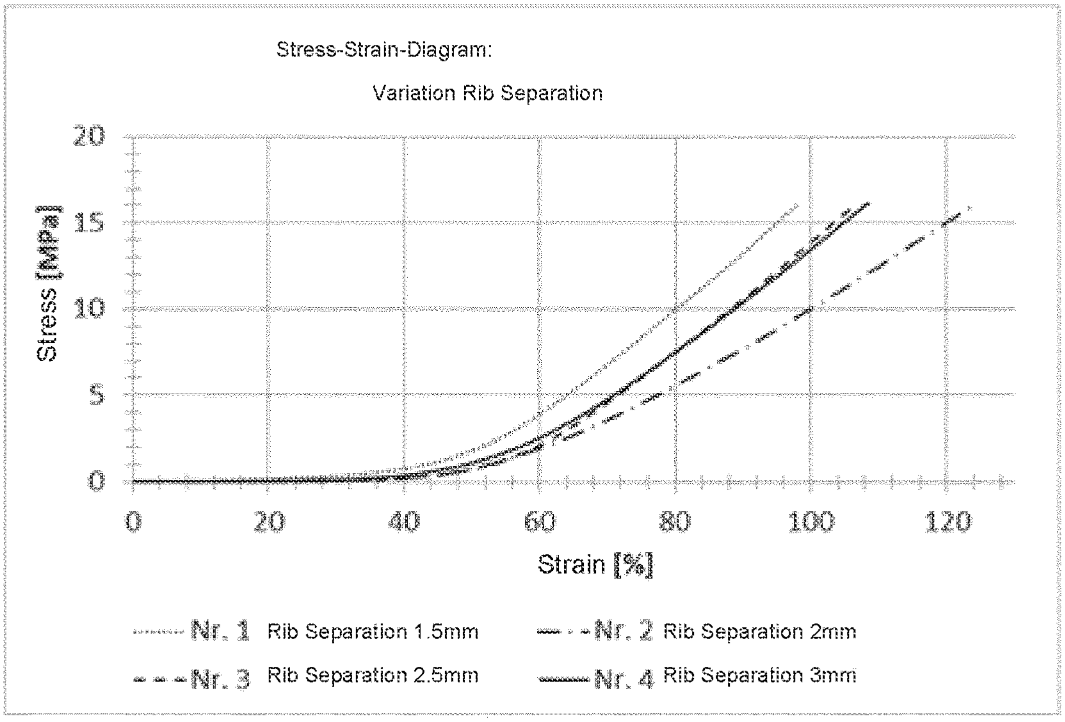
Figure 13:
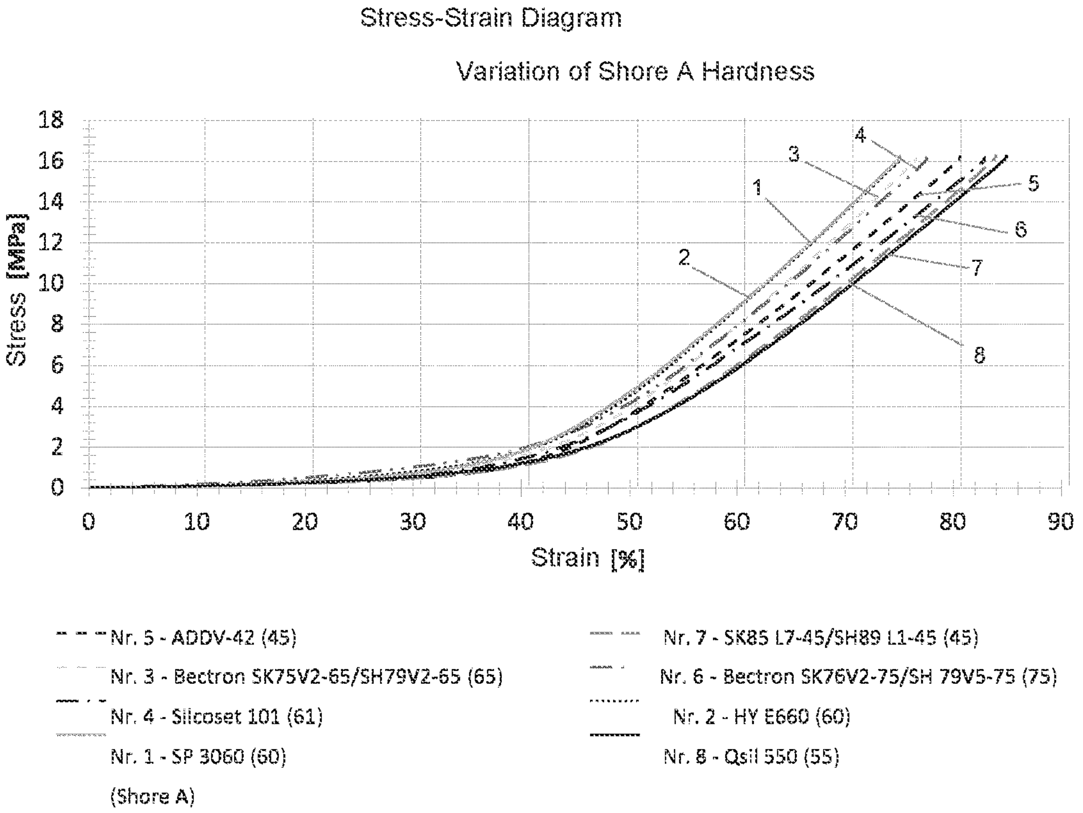
Figure 14:
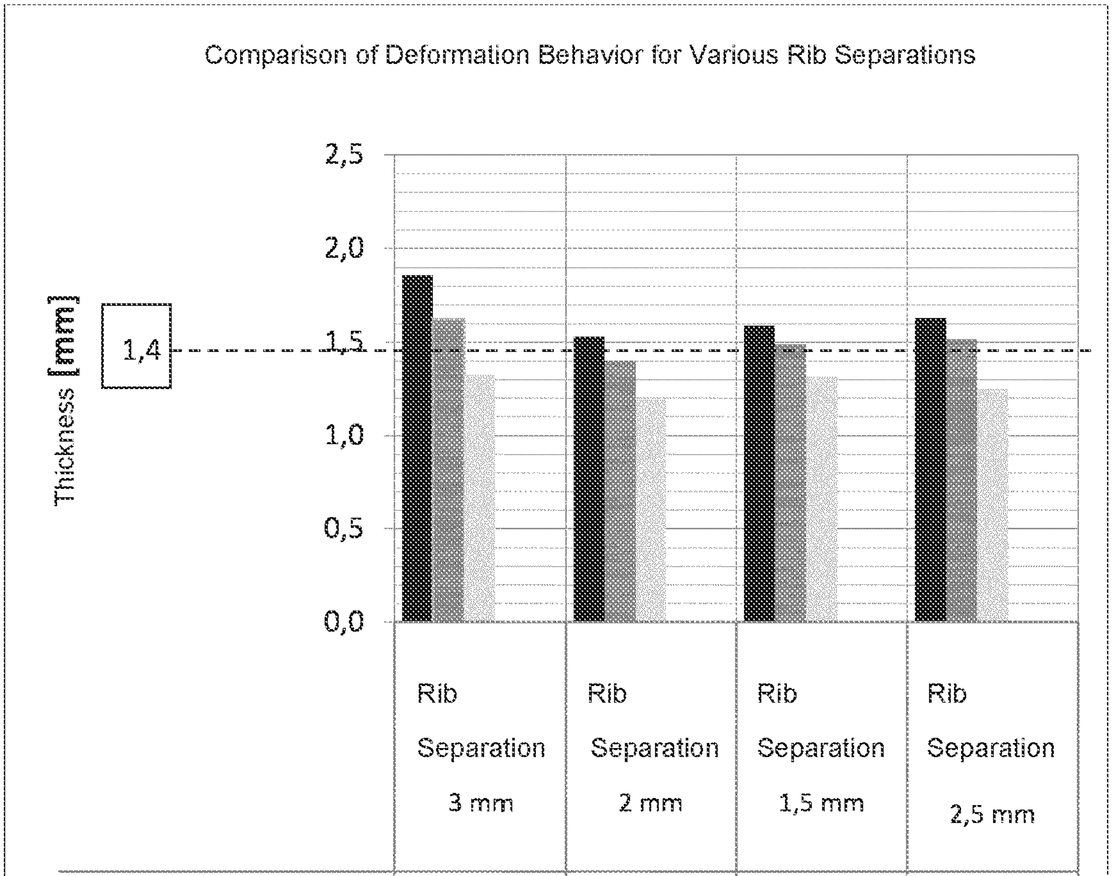

FIG. 5*a* shows a cut longitudinally through a rib and frame of the thermal insulating mat according to the invention in accordance with FIG. 4 in the unloaded state;

FIG. 5*b* shows the illustration in accordance with FIG. 5*a* in the pressure-loaded state;

FIG. 6 shows a schematic exploded illustration of the thermal insulating mat according to the invention without a frame;

FIG. 7 shows a schematic illustration of the base plate with the ribs arranged offset in the loaded (compressed) state;

FIG. 8*a* shows a view from above of the fundamental structure of a base plate according to the invention made of fiber-elastomer composite in the unloaded state;

FIG. 8*b* shows the structure in accordance with FIG. 8*a* in the loaded (compressed state);

FIG. 9*a* shows schematically, an embodiment for the basic structure of a base plate made of a fiber-elastomer composite and having added filler in the unloaded state;

FIG. 9*b* shows schematically, the structure in accordance with FIG. 9*a* in the loaded (compressed) state;

FIG. 10 shows a schematic plan view of the thermal insulating mat according to the invention with an embodiment for channel structures for discharge of gas;

FIG. 11 shows a diagram with the results of a heat transfer measurement on a test sample produced in accordance with the invention;

FIG. 12 shows a diagram with the spring characteristic curves of test samples produced in accordance with the invention as a function of the rib separation;

FIG. 13 shows a diagram with the spring characteristic curves of test samples prepared in accordance with the invention as a function of the hardness (Shore A) of the silicone elastomer; and FIG. 14 shows a diagram with a comparison of the deformation behavior of test samples prepared in accordance with the invention as a function of the rib separations.

Figure 1:
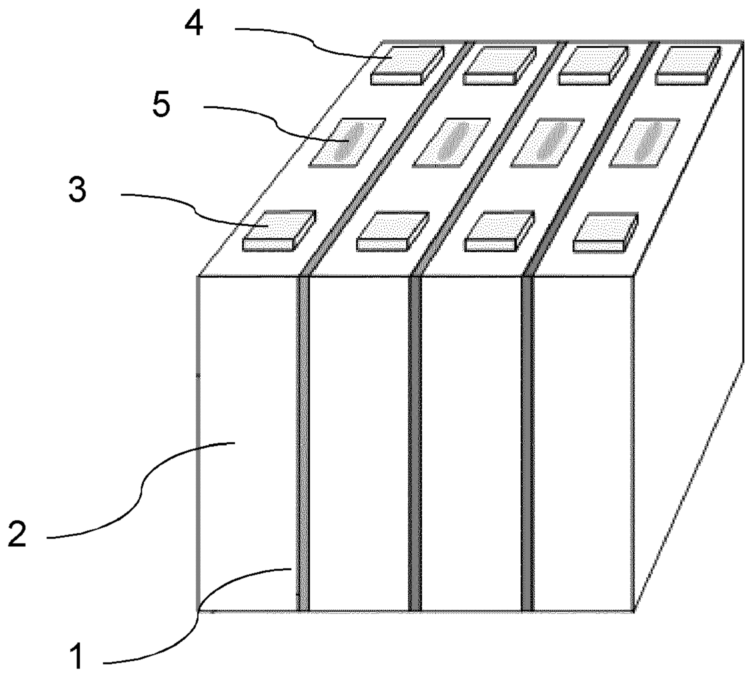

Shown in FIG. 1 is a battery arrangement with four prismatic battery cells 2 in accordance with prior art, in which, in each instance, a thermal insulating mat 1 according to the invention is provided between two adjacent cells 2.

The internal structure of the battery cell 2 is hermetically surrounded by a fixed cuboid-shaped or prismatic cell housing, which, on a narrow side surface, has two connecting terminals 3, 4 and a safety valve 5.

The safety valve 5 opens when the internal pressure of the cell due to reaction gases that are formed in consequence of a rise in temperature exceeds a critical value, so that the gases can escape and an explosion of the cell can be prevented.

Figure 2:
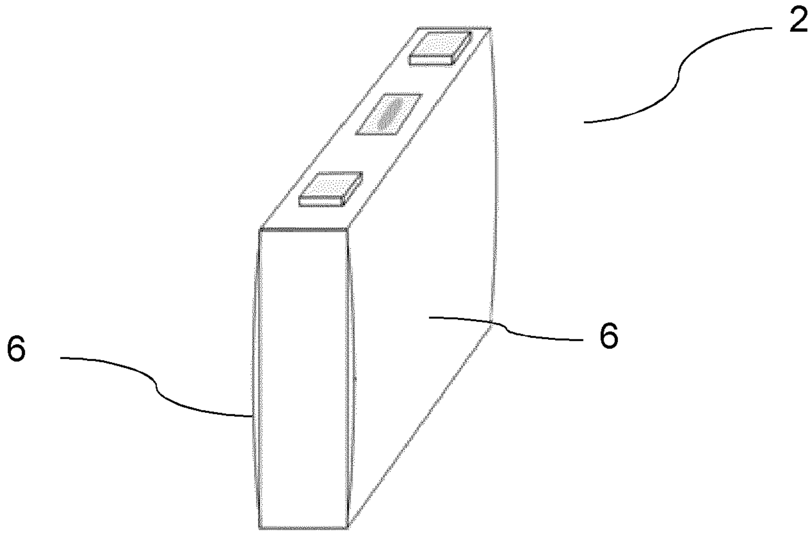
FIG. 2 shows a side view of a prismatic battery cell in the bulged state.

FIG. 2 shows a prismatic battery cell 2 with bulged main surfaces 6 of the cell housing. The deformation occurs essentially only in the middle region of the main surfaces 6, because the edges of the cell housing are mechanically stable by way of the corners to the bordering smaller side surfaces and, in normal operation, do not deform.

Figure 3:
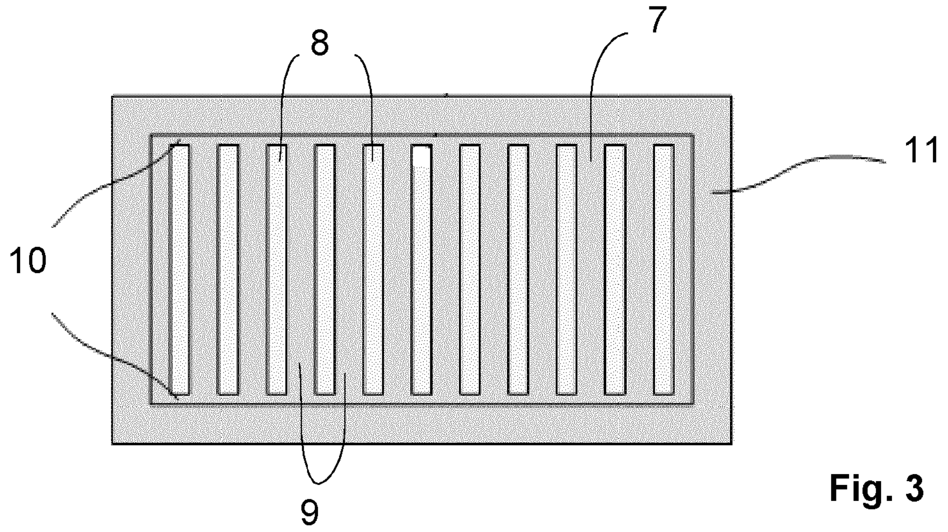
FIG. 3 shows a view from above of a thermal insulating mat according to the invention.

FIG. 3 is a view of the thermal insulating mat 1 according to the invention from above, in which the rib arrangement of the insulating mat according to the invention can clearly be seen, with the base plate 7 and a row of ribs 8 extending parallel to one another and extending at a separation 9 from one another transversely over the base plate 7. The separation 9 is hereby wider than the ribs 8.

The arrangement of the ribs is surrounded by a bordering frame 10, with the ribs 8 being decoupled from the frame 10; that is, the ribs 8 have no contact with the frame 10. Neither the front surfaces of the ribs 8 nor the side surfaces of the outer-lying ribs are joined to the frame 10, so that, between the front surfaces of the ribs 10 and the frame 8, there is a gap 11.

In this case, the frame 10 has a planar free top side, with which, in the installed state, the frame 10 rests against a surrounding edge of a battery cell. The frame 10 shown is also wider than the ribs 8, so that it possesses a higher resistance to deformation than the ribs. In the installed loaded state, the frame 10 can compensate for the pretensioning pressure without any influence of the pretensioning pressure on the ribs.

An illustration of the thermal insulating mat 1 according to the invention in a view from obliquely above is shown in FIG. 4. Clearly to be seen in the figure is the arrangement of the ribs 8 on the top main surface of the base plate 7 as well the bordering frame 10, which extends around both the top and bottom arrangement of the ribs, with the base plate 7 being arranged in between.

The base plate 7 has an intermediate layer 12 consisting of fiber material.

Illustrated in FIGS. 5*a* and 5*b* is a longitudinal cut along a rib 8 as well as through the bordering frame 10 in an unloaded state (FIG. 5*a*) as well as in the loaded state during application of pressure to the frame 10 as a result of the pretensioning pressure applied during assembly of a battery module.

In the unloaded state, the height of the frame 10 is higher than that of the ribs 8. Between the front surface of the ribs 8 and the frame 10, there is a gap 11, which progresses around the entire arrangement of ribs.

FIG. 5*b* shows the state during application of pressure due to the pretensioning pressure that is applied to the battery module during assembly. As a result of the pretensioning pressure, the frame 10 is compressed in its height, whereby the height of the frame 10 and that of the ribs 8 are matched. The gap 11 remains also during application of pressure to the frame 10, so that, also during application of pressure to the frame 10, a decoupling of the ribs 8 from the bordering frame 10 exists.

The adjustment of the desired resistance to deformation can be effected by way of the width of the frame, with the resistance to deformation increasing with the width. Furthermore, the resistance to deformation can be adapted through the choice of the material, the degree of crosslinking of the elastomer, the compression modulus, etc.

As a result, in the assembled module with the thermal insulating mat 1 arranged between two battery cells 2, the frame 10 is loaded by the pretensioning pressure, whereas the ribs 8 remain essentially unloaded.

FIG. 6 shows an exploded illustration of an embodiment of the thermal insulating mat 1 according to the invention, in which, in order to highlight the structures, the bordering frame 10 has been omitted.

To be seen is the arrangement of the ribs 8 on the main surfaces of the base plate 7, with the ribs 8 on each main surface being arranged parallel to one another and at a separation 9 from one another and with the ribs 8 extending transversely over the main surface.

The separation 9 between the ribs 8 of a main surface is hereby greater than the width of the ribs 8. Preferably, the separation 9 is at least 1.5 times to 2 times the width of the ribs 8.

The ribs of the two main surfaces are arranged offset in relation to one another, with a rib 8 of the one main surface extending along a separation 9 of the other main surface.

The base plate 7 is formed from an elastomer material that has an intermediate layer consisting of mineral fibers 12.

If, in accordance with further embodiments, one or two further intermediate layers 12 consisting of fiber material are provided, it is possible to provide additional elastomer material as a binder between two intermediate layers consisting of fiber material.

It is possible to use the same elastomer material for the production of the base plate 7 with an intermediate layer consisting of fiber material 12 and for the ribs 8, whereby the ribs 8 can be formed as an integral component of the base plate 7. The frame 10, too, can be formed from the same elastomer material and can be formed as an integral component together with the base plate 7.

In the course of an increasing bulging of the main surfaces of battery cells (not shown here), pressure is applied to the ribs 8 and the ribs 8, together with the underlying base plate 7, are pressed into the separations 9 of the offset arrangement of the ribs 8 of the opposite-lying main surface of the base plate 7, as shown in FIG. 7.

In this compressed state, the base plate 7 forms a zigzag curve with curvatures projecting alternately above and below into the respective separations 9. With decreasing application of pressure in the course of discharging the battery cells, for example, these deformations rebound correspondingly on account of the elasticity of the base plate 7.

The extent of the deformation is essentially determined by the width of the separation 9 as well as by the deformability of the base plate, which, in particular, is influenced by the hardness (elasticity) of the elastomer and the orientation of the fibers, as is illustrated by way of example in FIGS. 8*a, b* as well as 9*a, b.*

FIGS. 8*a, b* as well as 9*a, b* show, respectively, a plan view of the base plate 7 with the fiber intermediate layer 12 with schematic illustration of the internal structure in the unloaded state (FIGS. 9*a* and 10*a*) and in the compressed state (FIGS. 9*b* and 10*b*).

The fibers of the fiber intermediate layer 12 each have a ±450 orientation, so that fibers with different signs cross at a 900 angle 14*a*. The elastomer matrix 13 in which the fibers are embedded is indicated as a gray surface. Further illustrated are the ribs 8, which extend transversely over the surface. The edge extending to the left and right along the ribs 8 indicates the underlying separation 9 between the ribs 8 arranged on the bottom side of the base plate 7 and provided in an offset arrangement.

In the unloaded state shown here, the fibers with different signs cross at a 90° angle 14*a*.

If pressure is applied to the thermal insulating mat 1, there occurs a compression of the ribs 8 along the fiber matrix composite of the base plate 7 (indicated by the arrows pointing to the left and right) with a decrease in the width (indicated by the arrows at the top and bottom edge in the figure), as illustrated in FIG. 8*b*. In consequence thereof, the crossing angle 14*b* between the fibers is reduced to 60° in this case.

The deformation during application of pressure and compression of the ribs 8 of a base plate to which filler particles 15 have been added occurs in an analogous manner, as illustrated in FIG. 9*a* in the unloaded state and FIG. 9*b* in the compressed state.

In this case, too, there is a ±45° orientation of the fibers in the fiber intermediate layer 12 with a 90° crossing angle 14*a*.

For this example, filler particles 15 of differing size were used.

During compression in consequence of the pressure exerted by adjacent battery cells (not shown), the base plate 7 (left and right arrow) and the width of the base plate 7 decrease (top and bottom arrow). At the same time, the crossing angle 14*b* of fibers with different signs decreases to 60°.

In this case, in contrast to FIGS. 8*a* and 8*b*, the extent of the deformation is controlled additionally by the filler particles 15, because, owing to the compression, the separation between the particles 15 decreases. Once the separation has decreased so much that the particles 15 come into contact and engage with one another, any further deformation is blocked, because the fibers can no longer shift in relation to one another.

gases from the intermediate space lying between the cell wall and the thermal insulating mat 1.

Investigations were undertaken on the insulation effect and on the elongation behavior of thermal insulating mats according to the invention. The results are presented in the diagrams in FIGS. 11 to 14.

For the production test samples, commercially available two-component liquid silicones of different Shore A hardness, which crosslink at room temperature, were used as silicone elastomer. The product data and manufacturers are presented in Table 1.

TABLE 1

| | Product name | | | | | | | |
|---|---|---|---|---|---|---|---|---|
| | ADDV42 | SK85 L7-45/ SH89 L1-45 | Bectron SK75V2-65 SH79V2-65 | Bectron SK76V2-75/ SH79V5-75 | Qsil 550 | Silcoset 101 | HY E660 | SP 3060 |
| Mixture | 1:1 | 10:1 | 1:1 | 100:2.5 | 1:1 | 100:1 | 1:1 | 1:1 |
| Crosslinking | Add | Add | Add | Cond | Add | Cond | Add | Add |
| Shore A [°] | 45 | 45 | 65 | 75 | 55 | 61 | 60 | 60 |
| Viscosity [mPas] | 9000 | 25000 | 3500 | 7500 | 4000 | 40000 | 10000 | 25000 |
| Thermal conductivity [W/mK] | | 0.54 | 0.45 | 0.42 | 0.37 | 0.37 | 0.25 | 0.1 |
| | ↓ | ↓ | ↘ | ↙ | ↓ | ↙ | ↓ | ↓ |
| Manufacturer/Distributer | D&G Faserverbund-Werkstoffe GmbH | ELANTAS | ELANTAS | | ACC Silicones | | Shenzhen Hongyejie Co. Ltd. | Donguan Gangtian Polymer Materials Co. Ltd. |

Add: Addition
Cond: Condensation

FIG. 10 is a plan view of a thermal insulating mat 1 according to the invention with parallel-arranged ribs 8, a bordering frame 10, and a gap 11 between the ribs 8 and the bordering frame 10, in which the ribs 8 have a structure consisting of breaks 16 that extend essentially transversely over the ribs 8.

These breaks 16 and outlet openings 17, 18 serve for discharging reaction gases that can form owing to phase transition and decomposition of fillers, in particular, during overheating. The gas phase hereby formed, together with the gas phase that results from the thermal decomposition of the elastomer, can lead to very high gas pressures in the region between the cell walls and the base plate 7 that is sealed by the frame 10. In order to relieve this pressure, it may be advantageous to integrate, as degassing aids, the breaks 16 and the outlet openings 17, 18 in a thermal insulating mat 1, such as is illustrated in FIG. 10, for example.

In this case, the breaks 16 are created in successive ribs 8 as a continuous structure. The breaks 16 in the rib arranged to the left and right next to a rib 8 hereby form the continuation of the break 16 in the rib 8 lying in between. As a result, a continuous channel for the discharge of gas is obtained. In the specific example shown in FIG. 10, the breaks 16 each extend in a diagonal line starting from the middle of the base plate in the direction of the four corners, resulting in the shape of a wide X as viewed overall.

Further provided in the short sides of the bordering frame 8 are outlet openings 17, 18 for the discharge of reaction The results of a heat transfer measurement carried out on a cell insulating mat by way of example are presented in FIG. 11. The investigation was carried out on a heat transfer measurement stand at an applied pressure of 1.9 bar for the simulation of the swelling process. The test sample piece was prepared from a silicone elastomer SK85L7 of the company ELANTAS with Shore A 45, produced with two layers of E-fiberglass fabric, each with an area weight of 163 $g/m^2$. The dimensions of the test sample piece were 235 mm×113.5 mm×2.0 mm, corresponding to the dimensions of a typical prismatic cell. The rib height was 0.4 mm, the rib width 1.0 mm, and the rib separation 2.0 mm.

For the measurement, the test sample was initially held for 5 minutes at 50° C. for homogeneous temperature distribution, with the pressure being regulated during this period of time.

Subsequently, heating was carried out within 200 seconds to 700° C. (without re-regulation of the pressure). The increase in temperature on the front side and back side was measured by means of a pyrometer.

The result established that, even after an increase in temperature on the front side from 50° C. to 700° C., the temperature of the back side was only below 100° C. The temperature of the back side was thus clearly within the range required for practical applications.

Presented in FIGS. 12 and 13 are stress-elongation diagrams with the spring characteristic curves of typical material test samples for the cell insulating mats according to the invention.

The dimensions of the test sample piece were 40 mm×40 mm, with a rib height of 0.4 mm, a rib width of 2 mm, and total thickness of the test sample of 2 mm. The thickness of the fiber intermediate layer was between 0.8 and 0.9 mm.

Presented in FIG. 12 in this case is the dependence of the spring behavior on the rib separation under otherwise identical conditions and presented in FIG. 13 is the change in the spring behavior as a function of the hardness of the silicone elastomer with fiberglass fabric under otherwise identical conditions.

For the test in accordance with FIG. 12, test sample pieces consisting of silicone elastomer ADDV-42 with a Shore A hardness of 45 and a fiber intermediate layer consisting of an E-fiberglass fabric of linen woven type with an area weight of 25 $g/m^2$ and an orientation of +/−45° were used.

For the tests presented in FIG. 13, the rib separation of the material test samples was uniformly 2 mm.

In each case, the fiber intermediate layer was an E-fiberglass fabric of the linen woven type with an area weight of 80 $g/m^2$ and an orientation of 0°/90°.

In this case, all of the test samples show an elongation of up to 40% in about a uniform behavior, with the curves 7 and 8 of the test samples consisting of SK85 L7-45 and QSil 550, with a Shore A hardness 45 and 55, respectively, exhibiting the smallest increase.

Presented in FIG. 14 is the deformation behavior of test samples of various thickness as a function of the rib separations under pretensioning load and full load. The dimensions of the test sample pieces were those for the tests in accordance with FIGS. 12 and 13 described above, albeit with a variation in the rib separations.

Used for the material structure was the silicone elastomer SK85 L7-45 in accordance with Table 1, which has two fiber intermediate layers consisting of an E-fiberglass fabric of the linen woven type with an area weight of 80 $g/m^2$ and an orientation of +/−45°.

The initial thickness of the individual test samples without application of pressure varied from 1.860 mm to 1.530 mm. The test samples were subjected to a pretensioning load of 0.186 $N/mm^2$ and to a maximum surface pressure of 1.115 $N/mm^2$ and the extent of the deformation was measured. The pretensioning force hereby corresponded to the pretensioning force of 5 kN usually used. The variation in the deformation around a target thickness of 1.4 mm under pretensioning load should be measured, as typically is striven after nowadays for applications with prismatic battery cells.

The best result was hereby found for the test sample with a rib separation of 2 mm and for the test samples with rib separations of 1.5 mm and 2.5 mm, the pretensioning thickness of which was only slightly above the desired value of 1.4 mm.

The present invention relates to a thermal insulating mat 1 for the insulation of adjacent battery cells 2, in particular prismatic battery cells, in battery systems consisting of an elastically deformable base plate 7 made of a fiber-elastomer composite, wherein, on both main surfaces of the base plate 7, a defined number of ribs 8 are provided, extending parallel to one another and spaced apart from one another transversely over the main surfaces of the base plate 7, wherein the rib arrangement of the two main surfaces is surrounded by a bordering frame 10 and, between the ribs 8 and frame 10, there is a gap 11, wherein the fiber-elastomer composite of the base plate 7 is formed from an elastomer matrix with at least one intermediate layer consisting of mineral fibers embedded therein, and wherein the thermal insulating mat is capable, at the same time, of compensating for the system-inherent change in the battery cells in consequence of the chemical ageing of the cell components and of the cyclic swelling and contraction of the cells during charging and discharging thereof.

LIST OF REFERENCE CHARACTERS

1 insulating mat
2 battery cell
3, 4 connection terminal
5 thermal safety valve
6 bulged main surfaces of a battery cell
7 base plate
8 ribs
9 separation (between two ribs)
10 surrounding frame
11 gap (between ribs and frame)
12 intermediate layer consisting of fibers
13 elastomer matrix
14 *a, b* crossing angle
15 filler particles
16 breaks
17, 18 outlet openings in the frame 10

What is claimed is:

1. A thermal insulating mat (1), in particular for insulation between adjacent battery cells (2) in battery systems, comprising an elastically deformable base plate (7) made of a fiber-elastomer composite,
wherein, on both main surfaces of the base plate (7), a number of ribs (8) are provided, extending parallel to one another and spaced apart from one another transversely over the main surfaces of the base plate (7),
wherein the rib arrangement of the two main surfaces is surrounded by a bordering frame (10) and there is a gap (11) between the ribs (8) and the frame (10), and
wherein the fiber-elastomer composite of the base plate (7) is formed from an elastomer matrix with at least one intermediate layer consisting of mineral fibers.

2. The thermal insulating mat (1) according to claim 1, wherein the elastomer material is chosen from a silicone elastomer, styrene butadiene rubber (SBR), acrylonitrile butadiene rubber (NBR), natural rubber (NR), butyl rubber, isobutene isoprene rubber (IR), isoprene rubber (IR), and polyurethane (PUR).

3. The thermal insulating mat (1) according to claim 2, wherein the elastomer is chosen from among a silicone elastomer and a polyurethane.

4. The thermal insulating mat (1) according to claim 1, wherein the mineral fibers for the intermediate layer are chosen from among glass fibers, basalt fibers, silicate fibers, and oxide ceramic fibers.

5. The thermal insulating mat (1) according to claim 1, wherein, in the pressure-unloaded state, the height of the bordering frame (10) is greater than the height of the ribs (8) and the resistance to deformation of the bordering frame (10) is greater than the resistance to deformation of the ribs (8).

6. The thermal insulating mat (1) according to claim 5, wherein the width of the bordering frame (10) is greater than the width of the ribs (8).

7. The thermal insulating mat (1) according to claim 1, wherein the width of the separation (9) between two adjacent ribs (8) is at least 1.5 to 2 times the width of the ribs (8).

8. The thermal insulating mat (1) according to claim 1, wherein the ribs (8) and the bordering frame (10) are formed from an elastomer material.

9. The thermal insulating mat (1) according to claim 8, wherein the ribs (8) or both the ribs (8) and the bordering frame (10) are formed from the same elastomer material as the base plate.

10. The thermal insulating mat (1) according to claim 1, wherein the base plate (7) has two or a plurality of intermediate layers (12) consisting of mineral fibers.

11. The thermal insulating mat (1) according to claim 10, wherein, between two intermediate layers (12) consisting of mineral fibers, elastomer material is provided as a binder.

12. The thermal insulating mat (1) according to claim 1, wherein a metal foil that reflects IR radiation is provided in the base plate (7).

13. The thermal insulating mat (1) according to claim 1, wherein the base plate (7), the ribs (8), and the surrounding frame (10) are an integrated component.

14. The thermal insulating mat (1) according to claim 1, wherein the ribs (8) have transversely extending breaks (16) and/or at least one outlet opening (17, 18) is provided in the bordering frame (10) for the discharge of reaction gases.

15. Use of a thermal insulating plate according to claim 1 for battery systems having prismatic battery cells.

* * * * *